United States Patent
Shukunami et al.

(10) Patent No.: US 6,529,314 B1
(45) Date of Patent: Mar. 4, 2003

(54) METHOD AND APPARATUS USING FOUR WAVE MIXING FOR OPTICAL WAVELENGTH CONVERSION

(75) Inventors: Norifumi Shukunami, Sapporo (JP); Susumu Kinoshita, Kawasaki (JP); Toshio Hashi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/361,970

(22) Filed: Jul. 28, 1999

(30) Foreign Application Priority Data

Aug. 19, 1998 (JP) .......................................... 10-233070

(51) Int. Cl.$^7$ ................................................. G02F 2/02
(52) U.S. Cl. ..................................... 359/332; 359/341.1
(58) Field of Search ............................... 385/123, 142, 385/122, 37, 24; 359/341.1, 332, 341.3

(56) References Cited

U.S. PATENT DOCUMENTS

| | | | | |
|---|---|---|---|---|
| 4,784,450 A | * | 11/1988 | Jain et al. | 359/332 |
| 5,274,495 A | * | 12/1993 | Shirasaki | 359/330 |
| 5,386,314 A | * | 1/1995 | Jopson | 359/326 |
| 5,434,701 A | * | 7/1995 | Fatehi et al. | 359/244 |
| 6,342,965 B1 | * | 1/2002 | Kinoshita | 359/124 |

OTHER PUBLICATIONS

Hideo Ueda et al.; "Tempereature dependence of four wave mixing generated in Er–doped fiber"; Mar., 1998; 30p–ZL–11, p. 1159 (including complete English translation).

Hidenori Inoue et al.; "Resonant four–wave mixing in Er–doped optical fibers", 6aF02, pp. 141–142 (including complete English translation).

* cited by examiner

Primary Examiner—Frank G. Font
Assistant Examiner—Roy M. Punnoose
(74) Attorney, Agent, or Firm—Staas & Halsey LLP

(57) ABSTRACT

Method and apparatus using four wave mixing (FWM) for wavelength conversion. An optical waveguide doped with a rare earth element is pumped so that an input optical signal is amplified as the input optical signal travels through the optical waveguide. The optical waveguide is provided with at least one light which, together with the input optical signal, causes four wave mixing (FWM) to occur in the optical waveguide. The FWM causes a converted optical signal to be produced in the optical waveguide and having a wavelength different from the input optical signal. If the input optical signal is modulated by a transmission signal, then the converted optical signal will also be modulated by the transmission signal. The optical waveguide can be, for example, an erbium doped optical fiber operating as an erbium doped fiber amplifier (EDFA). Therefore, an EDFA can be used for both amplification and wavelength conversion.

86 Claims, 16 Drawing Sheets

METHOD AND APPARATUS USING FOUR WAVE MIXING FOR OPTICAL WAVELENGTH CONVERSION

CROSS-REFERENCE TO RELATED APPLICATIONS

This application is based on, and claims priority to, Japanese application 10-233070, filed Aug. 19, 1998, in Japan, and which is incorporated herein by reference.

BACKGROUND OF THE INVENTION

1. Field of the Invention

The present invention relates to an apparatus and method using four wave mixing (FWM) for wavelength conversion.

2. Description of the Related Art

Optical communication systems using fiber optical transmission lines are being used to transmit relatively large amounts of information. However, as users require larger amounts of information to be rapidly transmitted, and as more users are connected to the systems, a further increase in the transmission capacity of optical communication systems is required.

Therefore, wavelength division multiplexing (WDM) is becoming an indispensable technique for increasing the transmission capacity of optical communication systems. In a system adopting WDM, a plurality of optical carriers (channels) having different wavelengths are individually modulated to thereby obtain a plurality of optical signals. These optical signals are then wavelength division multiplexed by an optical multiplexer to obtain WDM signal light. The WDM signal light is then transmitted through a single optical fiber functioning as an optical fiber transmission line. On the receiving side, the WDM signal light is received from the transmission line and then separated into individual optical signals by an optical demultiplexer. Each optical signal is then demodulated to reproduce the data conveyed by the optical signal. Accordingly, by applying WDM, the transmission capacity of a single optical fiber can be increased in accordance with the number of carriers (channels) multiplexed together and transmitted through the fiber. WDM can be contrasted to a conventional optical communication system where a single optical signal is transmitted through an optical fiber.

With an optical communication system employing WDM, it is often necessary to provide wavelength management and wavelength routing control between nodes of the system. For example, as indicated above, a WDM signal includes many wavelengths multiplexed together. In many cases, it may be necessary to convert one wavelength into a different wavelength, or to drop out, or add, wavelengths. Preferably, such wavelength management and wavelength routing control is performed efficiently and at minimum cost.

With an optical communication system employing WDM, wavelength management and wavelength routing control can be realized by performing wavelength identification at each node.

In this respect, a lightwave network which combines WDM and wavelength routing will likely be a significant part of next generation trunk systems. Wavelength conversion will be a key technology in realizing such a lightwave network.

Conventionally known is a method for wavelength conversion utilizing four-wave mixing (FWM). FWM is a third-order nonlinear phenomenon of light. When light enters an optical medium, the light propagates in accordance with the correlation between incident electric field E and polarization density P induced in the optical medium by the incident electric field E. In general, the relation between electric field E and polarization density P is expressed as follows:

$$P = \epsilon_0 \chi E + 2dE^2 + 4\chi^{(3)}E^3 + \ldots$$

The first term is a term indicative of linearity, which shows the fact that the polarization density is proportional to the electric field under the condition where the latter is relatively weak. When the electric field (optical power) becomes strong, the second and subsequent terms are not negligible and most optical media show nonlinear response. The second term is a term indicative of second-order nonlinear effects. This term is negligible in an isotropic medium such as silica ($SiO_2$).

When three optical waves having frequencies of $\omega_1$, $\omega_2$, and $\omega_3$ enter a medium showing third-order nonlinear effects, the following equation holds.

$$E(\omega) = E_1 \exp(i\omega_1 t) + E_2 \exp(i\omega_2 t) + E_3 \exp(i\omega_3 t)$$

Then, the third-order nonlinear polarization density $p = 4\chi^{(3)} E^3$ includes a new frequency represented by $(\omega_1 + \omega_2 + \omega_3)$ and $(\omega_1 + \omega_2 - \omega_3)$. Letting $\omega_4$ denote this new frequency, the following equations hold.

$$\omega_4 = \omega_1 + \omega_2 + \omega_3$$

$$\omega_4 = \omega_1 + \omega_2 - \omega_3$$

Thus, a new optical wave having a frequency $\omega_4$ is generated. The wavelength conversion is performed on the principle mentioned above.

FIG. 1(A) is a diagram illustrating a conventional technique for wavelength conversion. Referring now to FIG. 1(A), a semiconductor optical amplifier 2 is a nonlinear optical medium having an active layer 4 for guiding optical waves. When signal light having a frequency $\omega_s$ and pump light having a frequency $\omega_p$ are input into semiconductor optical amplifier 2, phase-conjugated light having a frequency $(2\omega_p - \omega_s)$ is output together with the signal light and the pump light from semiconductor optical amplifier 2. In this manner, wavelength conversion from the signal light to the phase-conjugated light is performed. In the case that the signal light and/or the pump light is/are preliminarily modulated, the phase-conjugated light reflects this modulation.

FIG. 1(B) is a diagram illustrating another conventional technique for wavelength conversion. Referring now to FIG. 1(B), a DFB laser 6 has an active layer 8 for guiding optical waves and a corrugated diffraction grating 10 formed along active layer 8. Diffraction grating 10 may be provided by a refractive index distribution.

In DFB laser 6, pump light is generated by oscillation. Accordingly, phase-conjugated light can be obtained simply by inputting signal light into DFB laser 6.

The techniques for wavelength conversion in FIGS. 1(A) and 1(B) have a problem in that conversion efficiency of the wavelength conversion is low.

Further, high-accuracy positioning with lenses or similar devices is necessary for optical connection of each of semiconductor optical amplifier 2 and DFB laser 6 to optical fibers, so that it is difficult to optically connect each component to the optical fibers with a low connection loss. Particularly, in the technique for wavelength conversion using semiconductor optical amplifier 2 shown in FIG. 1(A), a light source for outputting the pump light is required, thereby complicating the configuration.

SUMMARY OF THE INVENTION

Accordingly, it is an object of the present invention to provide an apparatus and method for wavelength conversion with an improved conversion efficiency.

It is another object of the present invention to provide an apparatus and method for wavelength conversion which allows optical components to be easily connected to optical fibers with low connection loss, and has a simple configuration.

Additional objects and advantages of the invention will be set forth in part in the description which follows, and, in part, will be obvious from the description, or may be learned by practice of the invention.

The foregoing objects of the invention are achieved by providing an optical waveguide doped with a rare earth element and pumped so that an input optical signal is amplified as the input optical signal travels through the optical waveguide. The optical waveguide is provided with at least one light which, together with the input optical signal, causes four wave mixing (FWM) to occur in the optical waveguide. The FWM causes a converted optical signal to be produced in the optical waveguide and having a wavelength different from the input optical signal. The input optical signal is modulated by a transmission signal, so that the converted optical signal is also modulated by the transmission signal. The optical waveguide can be, for example, an erbium doped optical fiber operating as an erbium doped fiber amplifier (EDFA).

Objects of the present invention are also achieved by providing an apparatus which includes a rare earth doped optical fiber, and a pump source. The rare earth doped optical fiber has first and second lights travelling therethrough. The pump source provides pump light to the fiber so that the first light is amplified as the first light travels through the fiber, wherein the first and second lights together cause four wave mixing (FWM) to occur in the fiber. The FWM causes a third light to be produced in the fiber and having a wavelength different from the first light.

Moreover, objects of the present invention are achieved by providing an apparatus which includes a rare earth doped optical fiber having first, second and third lights travelling therethrough. A pump source provides pump light to the fiber so that the first light is amplified as the first light travels through the fiber, wherein the first, second and third lights together cause four wave mixing (FWM) to occur in the fiber. The FWM causes a fourth light to be produced in the fiber and having a wavelength different from the first light.

In addition, objects of the present invention achieved by providing an apparatus which includes a rare earth doped optical fiber, a pump source and a filter. The fiber has first and second lights travelling therethrough. The pump source pumps the fiber so that the first light is amplified as the first light travels through the fiber, wherein the first and second lights together cause four wave mixing (FWM) to occur in the fiber. The FWM causing a third light to be produced in, and output from, the fiber, the third light having a wavelength different from the first and second lights. The filter is optically connected to the fiber to filter light output from the fiber. The filter has a passband which passes the third light and rejects light having a wavelength different from that of the third light. The fiber can be an erbium doped optical fiber. As a result, the apparatus operates as an erbium doped fiber amplifier (EDFA) which amplifies an optical signal, and also uses the principles of FWM to convert the optical signal to a different wavelength for wavelength conversion and wavelength management.

Objects of the present invention are also achieved by providing a method which includes (a) pumping a rare earth doped optical fiber so that a first light travelling through the fiber is amplified; (b) providing a second light which travels through the fiber and, together with the first light, causes four wave mixing (FWM) to occur in the fiber, the FWM causing a third light to be produced in the fiber and having a wavelength different from the first light.

Further, objects of the present invention are achieved by providing an optical communication system which includes a transmitter, a rare earth doped optical fiber, a pump source, a light source and a receiver. The transmitter transmits an optical signal which travels through the fiber. The pump source provides pump light to the fiber so that the optical signal is amplified as the optical signal travels through the fiber. The light source provides a light to the fiber so that the light, together with the optical signal, causes four wave mixing (FWM) to occur in the fiber, the FWM causing a converted optical signal to be produced in the fiber and having a wavelength different from the optical signal transmitted by the transmitter. The receiver receives the converted optical signal from the fiber.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
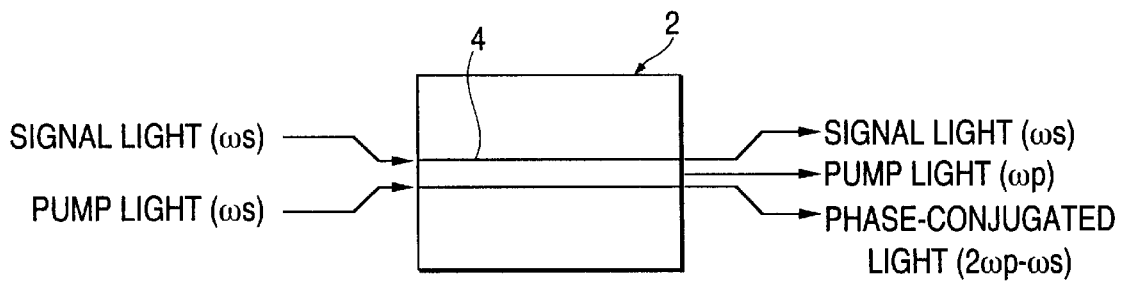
FIGS. 1(A) and 1(B) (prior art) are diagrams for illustrating different techniques for wavelength conversion.
Figure 1B:
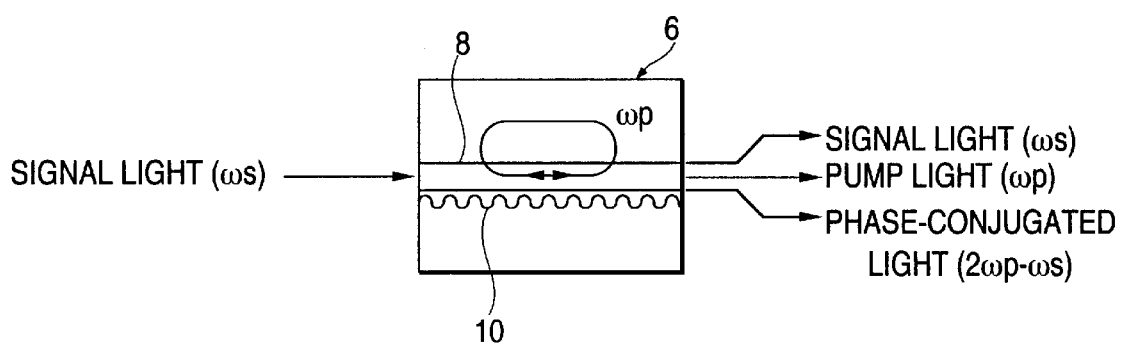

Reference will now be made in detail to the present preferred embodiments of the present invention, examples of which are illustrated in the accompanying drawings, wherein like reference numerals refer to like elements throughout.

An experiment carried out to confirm the occurrence of four-wave mixing (FWM) in an erbium doped fiber (EDF) will first be described with reference to FIGS. 2 and 3.

Figure 2:
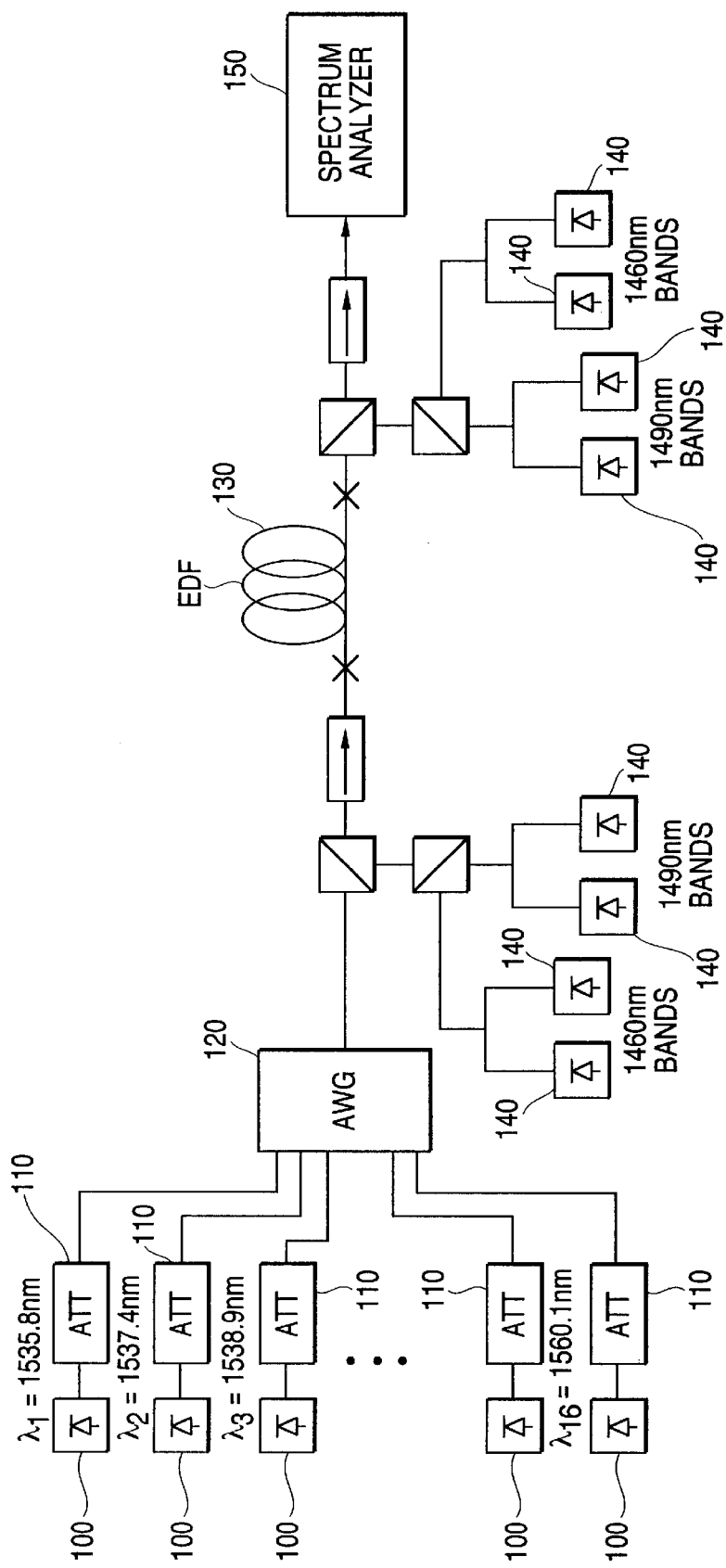
FIG. 2 is a diagram showing an experimental system used to confirm four-wave mixing (FWM) in an erbium doped fiber (EDF).

More specifically, FIG. 2 is a diagram showing an experimental system used to confirm four-wave mixing (FWM) in an erbium doped fiber (EDF). In the experiment, sixteen optical signals are produced by sixteen laser diodes 100, respectively. Each optical signal is at a different wavelength. The wavelengths $\lambda_1$ to $\lambda_{16}$ of the optical signals were set to be substantially equally spaced along a wavelength axis, more specifically, set to 1535.8 nm, 1537.4 nm, 1538.9 nm, . . . , and 1560.1 nm. The optical signals were attenuated by attenuators (ATT) 110, respectively, to control the power levels of the optical signals.

The attenuated optical signals were combined by an array waveguide grating (AWG) 120 into a wavelength division multiplexed (WDM) light which was supplied to one end of an erbium doped fiber (EDF) 130. EDF 130 which was bidirectionally pumped by eight laser diodes 140. More specifically, the eight laser diodes 140 for bidirectional pumping included four laser diodes for forward pumping and four laser diodes for backward pumping. The four laser diodes for each of the forward pumping and the backward pumping were provided by two laser diodes each having an oscillation wavelength band of 1460 nm and two laser diodes each having an oscillation wavelength band of 1490 nm. Light output from EDF 130 was supplied to a spectrum analyzer 150.

Figure 3:
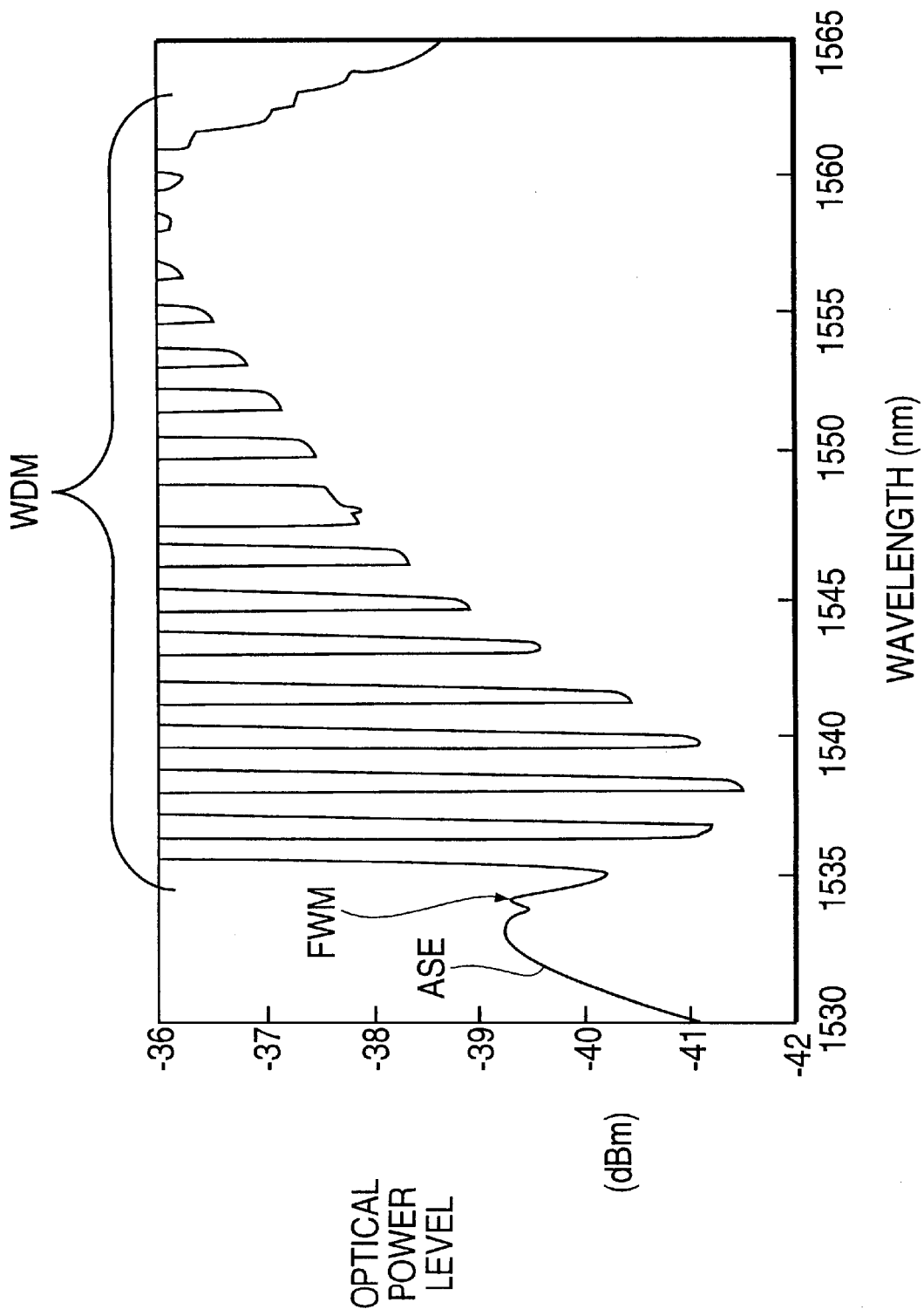
FIG. 3 is a graph showing a spectrum of light generated by FWM in the experiment shown in FIG. 2.

FIG. 3 is a graph showing a spectrum of light generated by FWM, as measured by spectrum analyzer 150. In FIG. 3, reference symbol ASE denotes a gentle spectrum of amplified spontaneous emission (ASE), and this ASE spectrum has two peaks near 1533 nm and 1558 nm. As denoted by reference symbol WDM in FIG. 3, sixteen sharp spectra corresponding to sixteen channels of WDM light are superimposed on this ASE spectrum.

Further, reference symbol FWM denotes a small spectrum generated near 1535 nm, and this spectrum is due to FWM occurring in the EDF.

Figure 4:
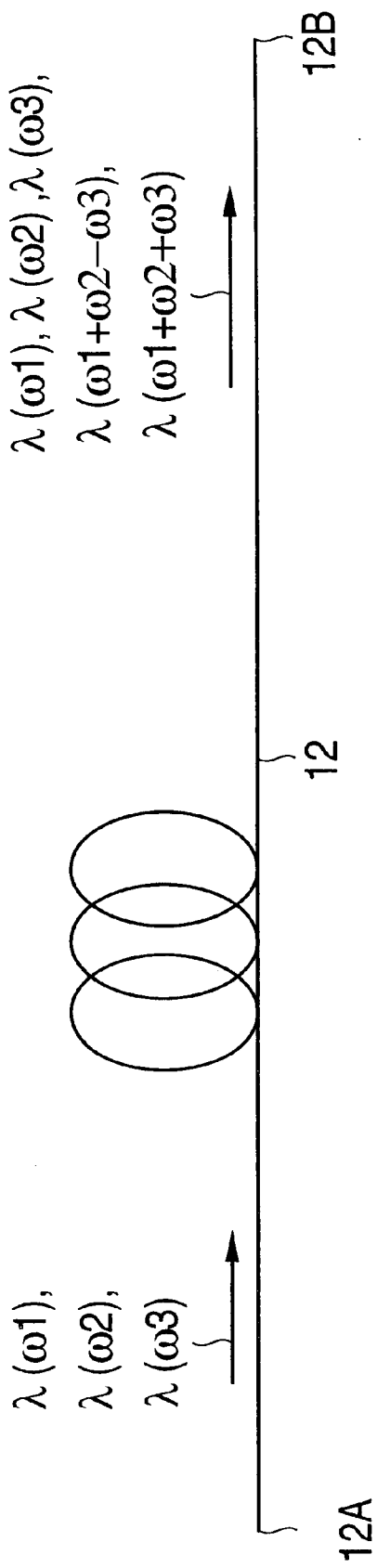
FIG. 4 is a diagram illustrating wavelength conversion, according to an embodiment of the present invention.

FIG. 4 is a diagram illustrating wavelength conversion, according to an embodiment of the present invention. Referring now to FIG. 4, an erbium doped fiber (EDF) 12 has a first end 12A and a second end 12B. EDF 12 may be manufactured by doping the core of a single-mode silica fiber with, for example, an erbium compound. Therefore, EDF 12 is an optical waveguide structure doped with the rare earth compound.

EDF 12 is pumped so that EDF 12 provides a gain band. For example, the pumping of EDF 12 may be performed by supplying light for pumping in a 0.98 µm band (0.96 µm–1.00 µm) or a 1.48 µm band (1.46 µm–1.50 µm) into EDF 12 from at least one of first end 12A and second end 12B. By setting the wavelength of the pumping light within a 0.98 µm band and/or a 1.48 µm band, a gain band including 1.55 µm can be obtained. Since losses in a silica fiber near 1.55 µm are low, this gain band is suitable in the case of using a silica fiber as an optical fiber transmission line.

The light for pumping to provide gain will hereinafter be referred to as "pumping light", so as to distinguish it from a pump light beam for FWM.

Input into EDF 12 from first end 12A are an optical signal having a wavelength $\lambda(\omega_1)$, a first pump light beam having a wavelength $\lambda(\omega_2)$, and a second pump light beam having a wavelength $\lambda(\omega_3)$. The symbol $\lambda(\omega)$ represents a wavelength corresponding to a frequency $\omega$ (angular frequency).

By FWM based on the optical signal and the first and second pump light beams in EDF 12, a converted optical signal is generated. The wavelength of the converted optical signal is $\lambda(\omega_1+\omega_2-\omega_3)$ or $\lambda(\omega_1+\omega_2+\omega_3)$. In the case that $\omega_1=\omega_2$, the wavelength of the converted optical signal is $\lambda(2\omega_1-\omega_3)$ or $\lambda(2\omega_1+\omega_3)$. In the case that $\omega_1=\omega_2=\omega_3$, the wavelength of the converted optical signal is $\lambda(3\omega_1)$.

The optical signal may be preliminarily modulated by a transmission signal. In this case, the converted optical signal is also modulated by the transmission signal on the principle of wavelength conversion by FWM. Accordingly, the present invention provides wavelength routing.

The wavelength of the optical signal and the wavelength of the converted optical signal are different from each other. Accordingly, the wavelength of each pump light beam is arbitrary.

Preferably, the optical signal and the first and second pump light- beams have wavelengths falling within the gain band provided by EDF 12. In this case, the optical signal and the first and second pump light beams input into EDF 12 are amplified in the EDF 12. Accordingly, the third-order term relating to an electric field E at a polarization density P as mentioned above can be relatively increased, so that FWM can be effectively produced to thereby improve the efficiency of conversion from the optical signal to the converted optical signal.

The pumping light may be supplied into EDF 12 either from first end 12A or second end 12B. Alternatively, it may be supplied into EDF 12 both from first end 12A and from second end 12B. In the case that the pumping light is supplied into EDF 12 from first end 12A, the pumping light propagates in EDF 12 in the same direction as the propagation direction of the optical signal and the first and second pump light beams in EDF 12, thus performing forward pumping. In the case that the pumping light is supplied into EDF 12 from second end 12B, the pumping light propagates in EDF 12 in the direction opposite to the propagation direction of the optical signal and the first and second pump light beams in EDF 12, thus performing backward pumping. Further, in the case that the pumping light is supplied into EDF 12 both from first end 12A and from second end 12B, bidirectional pumping is performed.

EDF 12 may be a polarization maintaining fiber (PMF). In this case, the polarization planes of the optical signal and the first and second pump light beams can be made substantially parallel (coincident) to each other, so that FWM can be effectively produced to thereby improve the efficiency of conversion from the optical signal to the converted optical signal.

Figure 5:
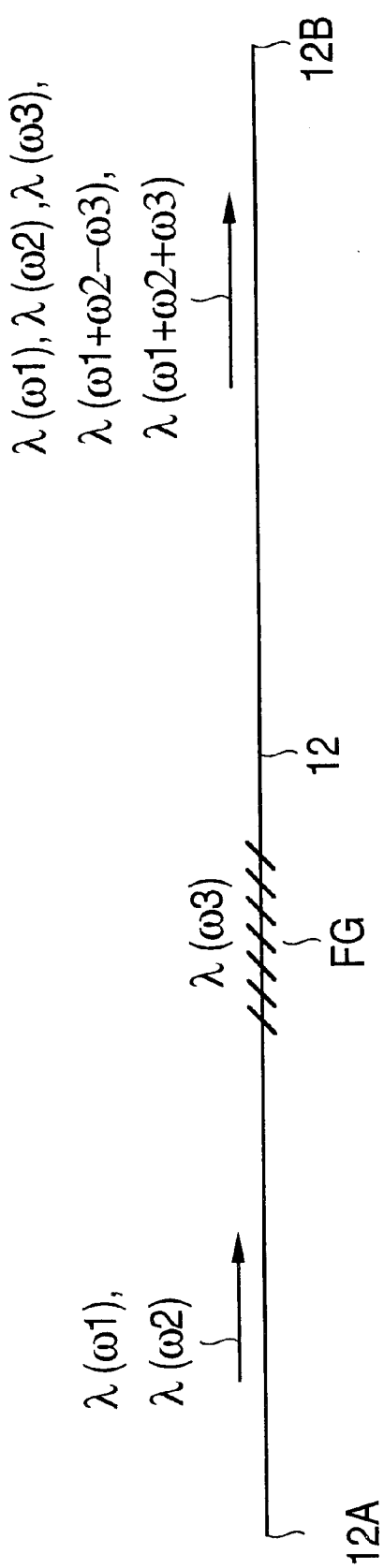
FIG. 5 is a diagram illustrating wavelength conversion, according to an additional embodiment of the present invention.

FIG. 5 is a diagram illustrating wavelength conversion, according to an additional embodiment of the present invention. Referring now to FIG. 5, a fiber grating (FG) is formed in a part or the whole of EDF 12. When EDF 12 formed with fiber grating FG is pumped, laser oscillation occurs in fiber grating FG at a wavelength determined by the grating pitch of fiber grating FG, and resultant light by the laser oscillation is used as the second pump light beam. In other words, the intensity of a wavelength ($\omega_3$) component of the ASE generated in EDF 12 is remarkably increased by the laser oscillation, thereby obtaining the second pump light beam having a wavelength ($\omega_3$).

In this embodiment of the present invention, an optical signal having a wavelength $\lambda(\omega_1)$ and a first pump light beam having a wavelength $\lambda(\omega_2)$ are supplied into EDF 12 from first end 12A, and no second pump light beam is supplied into EDF 12 from first end 12A. However, the second pump light beam having a wavelength $\lambda(\omega_3)$ is obtained by the laser oscillation in fiber grating FG, so that FWM occurs in EDF 12 on the basis of the optical signal and the first and second pump light beams, thereby converting the optical signal into a converted optical signal. Like the embodiment of the present invention in FIG. 4, the wavelength of the converted optical signal is $\lambda(\omega_1+\omega_2-\omega_3)$ or $\lambda(\omega_1+\omega_2+\omega_3)$. Particularly, in the case that $\omega_1=\omega_2$, the wavelength of the converted optical signal is $\lambda(2\omega_1-\omega_3)$ or $\lambda(\omega_1+\omega_3)$.

With the configuration in FIG. 5, it is unnecessary to supply the second pump light beam into EDF 12 from the outside thereof, thereby simplifying the configuration.

Figure 6:
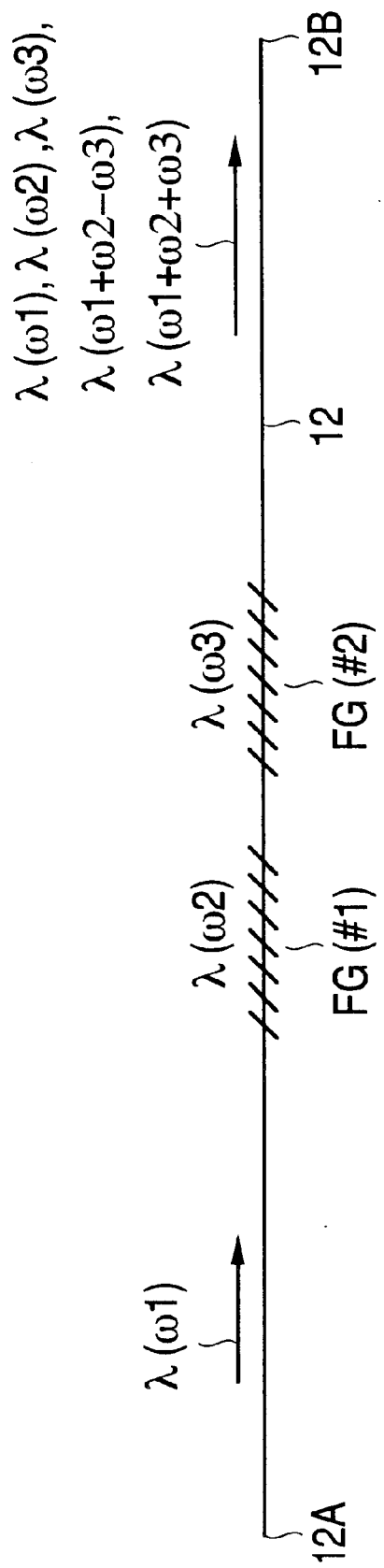
FIG. 6 is a diagram illustrating wavelength conversion, according to a further embodiment of the present invention.

FIG. 6 is a diagram illustrating wavelength conversion, according to a further embodiment of the present invention. Referring now to FIG. 6, two fiber gratings FG (#1 and #2) are formed in EDF 12. A first pump light beam having a wavelength $\lambda(\omega_2)$ is obtained by laser oscillation in fiber grating FG (#1), and a second pump light beam having a wavelength $\lambda(\omega_3)$ is obtained by laser oscillation in fiber grating FG (#2).

Accordingly, only an optical signal having a wavelength $\lambda(\omega_1)$ is supplied into EDF 12 from first end 12A, thereby generating FWM to convert the optical signal into a converted optical signal. The wavelength of the converted optical signal is $\lambda(\omega_1+\omega_2-\omega_3)$ or $\lambda(\omega_1+\omega_2+\omega_3)$.

With the configuration in FIG. 6, it is unnecessary to supply the first and second pump light beams into the EDF 12 the outside thereof, thereby simplifying the configuration.

Figure 7:
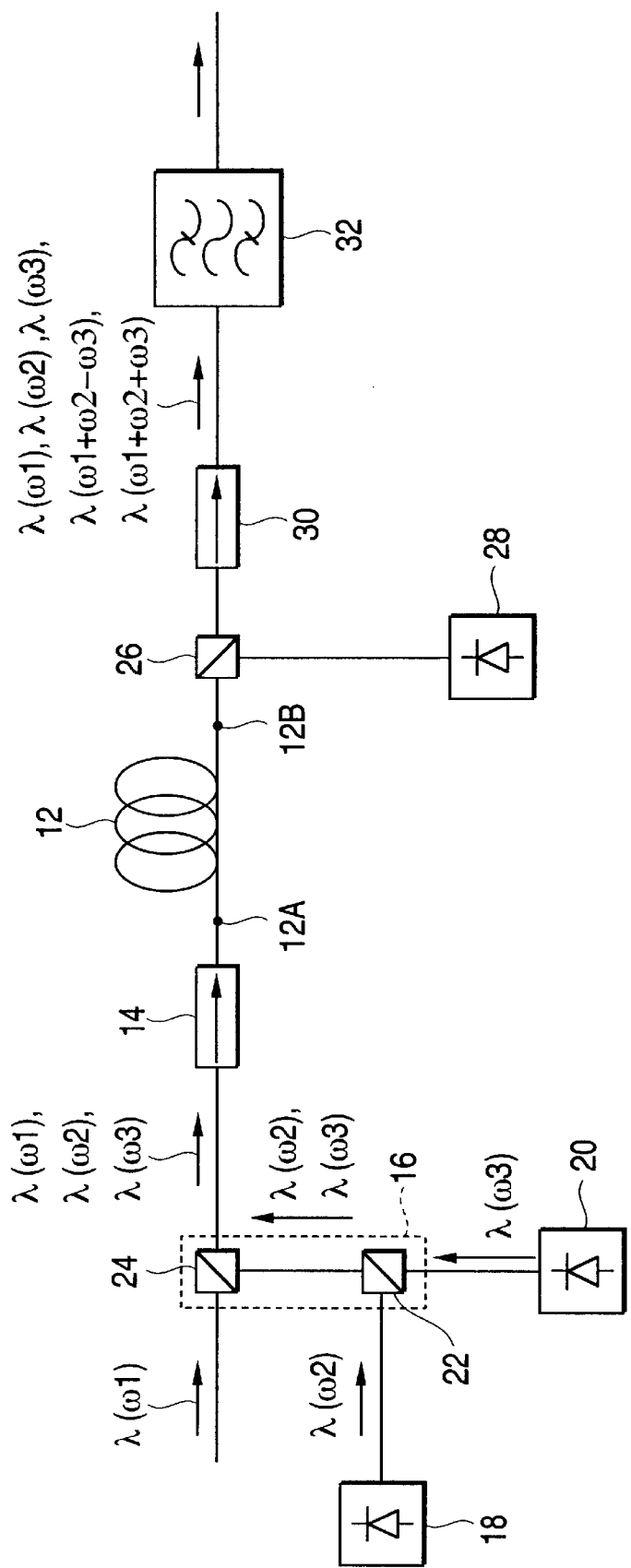
FIG. 7 is a diagram illustrating an apparatus for wavelength conversion, according to an embodiment of the present invention.

FIG. 7 is a diagram illustrating an apparatus for wavelength conversion, according to an embodiment of the present invention. This apparatus may be used to carry out wavelength conversion as illustrated, for example, in FIG. 4.

Referring now to FIG. 7, first end 12A of EDF 12 is optically connected to the output port of an optical isolator 14, and the input port of optical isolator 14 is optically connected to an optical multiplexer 16. Optical multiplexer 16 includes a WDM coupler 22 connected to laser diodes 18 and 20 for respectively outputting first and second pump light beams, and another WDM coupler 24 connected to WDM coupler 22.

The first and second pump light beams are combined together by WDM coupler 22. The resultant combined first and second pump light beams are then combined with an optical signal by WDM coupler 24. The resultant combined optical signal and first and second pump light beams are supplied through optical isolator 14 into EDF 12 from first end 12A.

To pump EDF 12, a laser diode 28 for outputting pumping light is connected through a WDM coupler 26 to second end 12B of EDF 12. The pumping light output from laser diode 28 is supplied through WDM coupler 26 into EDF 12 from second end 12B. Accordingly, EDF 12 undergoes backward pumping to provide a gain band.

The optical signal and the first and second pump light beams all amplified in EDF 12 are supplied through WDM coupler 26 and an optical isolator 30 in this order to an optical bandpass filter 32. Further, the converted optical signal generated by FWM in EDF 12 is also supplied through WDM coupler 26 and optical isolator 30 in this order to optical bandpass filter 32.

Optical bandpass filter 32 preferably has a pass band including the wavelength of the converted optical signal and not including the wavelengths of the optical signal and the first and second pump light beams, so that the converted optical signal is extracted by optical bandpass filter 32 and then output from this device.

In the case that the optical signal and the converted optical signal are modulated by a transmission signal, the first and second pump light beams are noise components. Accordingly, the use of optical bandpass filter 32 can improve a signal-to-noise ratio (SNR).

Optical bandpass filter 32 may be replaced by an optical band rejection filter or any other optical filters for extracting the converted optical signal.

Optical isolators 14 and 30 are used in the present embodiment to eliminate a possibility that an optical resonator structure including EDF 12 may be formed to cause undesired oscillation or a similar phenomenon.

In the case that the wavelengths of the optical signal and the first and second pump light beams are included in the gain band provided by EDF 12, FWM can be effectively produced so that a high efficiency of conversion from the optical signal to the converted optical signal is obtained. Further, EDF 12 is used as an optical waveguide structure doped with the rare earth compound, and EDF 12 can therefore be easily connected to peripheral components by, for example, splicing or other connection technique. Accordingly, this apparatus can be easily manufactured or a system adopting this apparatus can be easily constructed.

Figure 8:
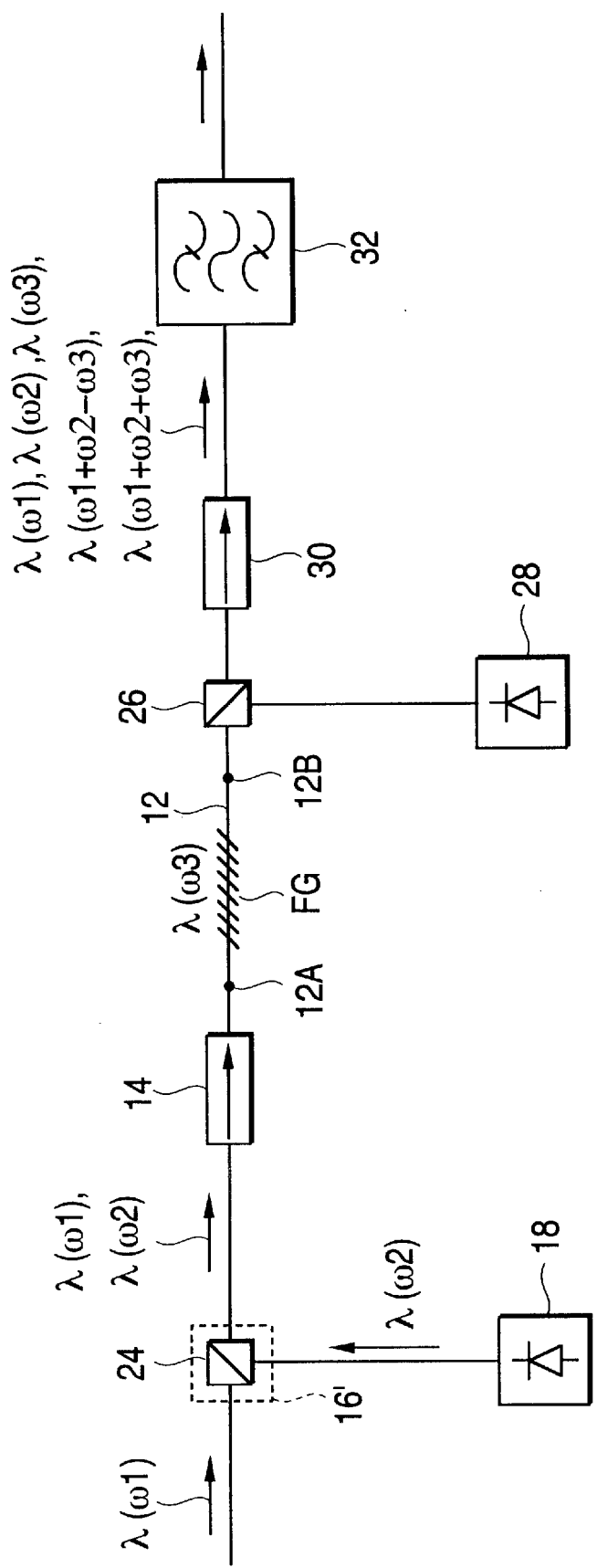
FIG. 8 is a diagram illustrating an apparatus for wavelength conversion, according to an additional embodiment of the present invention.

FIG. 8 is a diagram illustrating an apparatus for wavelength conversion, according to an additional embodiment of the present invention. This apparatus may be used to carry out wavelength conversion as in, for example, in FIG. 5.

Referring now to FIG. 8, a fiber grating FG for obtaining a second pump light beam having a wavelength $\lambda(\omega_3)$ by laser oscillation is formed in EDF 12. As a result, laser diode 20 for the second pump light beam shown in FIG. 7 is not required, and optical multiplexer 16 shown in FIG. 7 is replaced by an optical multiplexer 16' simplified in configuration.

More specifically, optical multiplexer 16' is provided by a WDM coupler 24 for combining a first pump light beam having a wavelength $\lambda(\omega_2)$ output from a laser diode 18 and an optical signal having a wavelength $\lambda(\omega_1)$. The optical signal and the first pump light beam combined by WDM coupler 24 are supplied through an optical isolator 14 to EDF 12.

With the configuration in FIG. 8, it is possible to obtain the same effect as that obtained by the configuration in FIG. 7, and it is also possible to obtain an additional effect that the apparatus can be simplified in configuration because laser diode 20 is not required and the configuration of optical multiplexer 16' can therefore be simplified.

Figure 9:
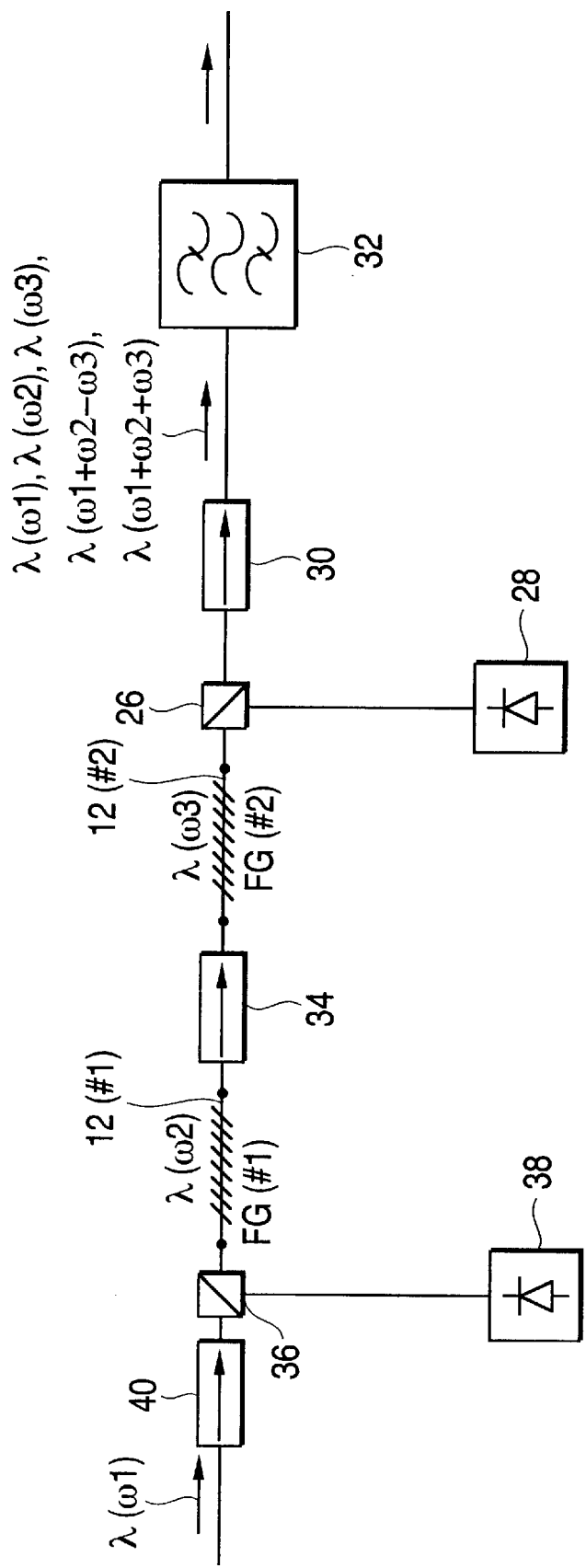
FIG. 9 is a diagram illustrating an apparatus for wavelength conversion, according to a further embodiment of the present invention.

FIG. 9 is a diagram illustrating an apparatus for wavelength conversion, according to a further embodiment of the present invention. This apparatus may be used to carry out wavelength conversion as in, for example, FIG. 6.

Referring now to FIG. 9, two separate EDFs 12 (#1 and #2) are used in place of EDF 12 used in previous embodiments, and an optical isolator 34 is provided between EDFs 12 (#1 and #2). EDFs 12 (#1 and #2) are formed with fiber gratings FG (#1 and #2), respectively.

Pumping light output from a laser diode 28 is supplied through a WDM coupler 26 to EDF 12 (#2). However, the pumping light passed through EDF 12 (#2) is blocked by optical isolator 34, so that it is not supplied to EDF 12 (#1). To pump EDF 12 (#1), EDF 12 (#1) is connected through a WDM coupler 36 to a laser diode 38 for outputting pumping light for EDF 12 (#1).

The pumping light output from laser diode 38 and an optical signal having a wavelength $\lambda(\omega_1)$ passed through an optical isolator 40 are combined together by WDM coupler 36. The combined optical signal and pumping light are then supplied into EDFs 12 (#1 and #2).

A first pump light beam having a wavelength $\lambda(\omega_2)$ is generated by laser oscillation in fiber grating FG (#1), and a second pump light beam having a wavelength $\lambda(\omega_3)$ is generated by laser oscillation in fiber grating FG (#2).

The optical signal and the first and second pump light beams all amplified in EDFs 12 (#1 and #2) are supplied through WDM coupler 26 and an optical isolator 30 in this order to an optical bandpass filter 32. Further, a converted optical signal generated by FWM in EDFs 12 (#1 and #2) is also supplied through WDM coupler 26 and optical isolator 30 in this order to optical bandpass filter 32.

The converted optical signals extracted by optical bandpass filter 32 and 13 then output from this apparatus.

With the configuration in FIG. 9, it is possible to obtain the same effect as that obtained in FIG. 7, and it is also possible to obtain an additional effect that laser diodes 18 and 20 shown in FIG. 7. As a result, optical multiplexer 16 is not required, thereby simplifying the configuration.

Figure 10:
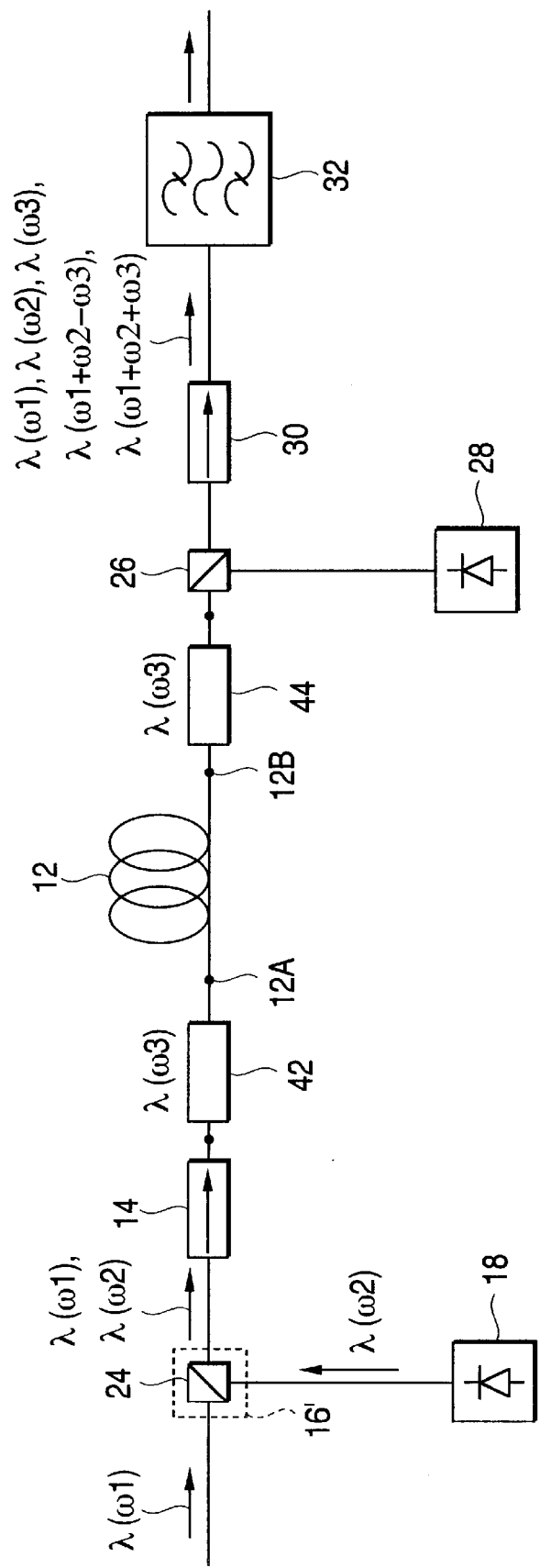
FIG. 10 is a diagram illustrating an apparatus for wavelength conversion, according to a still further embodiment of the present invention.

FIG. 10 is a diagram illustrating an apparatus for wavelength conversion, according to a still further embodiment of the present invention. With the configuration in FIG. 8, the second pump light beam having a wavelength $\lambda(\omega_3)$ is generated by distributed feedback (DFB) in the fiber grating FG formed in EDF 12. In contrast thereto, in FIG. 10, distributed Bragg reflection (DBR) is applied to EDF 12 to thereby generate the second pump light beam having a wavelength $\lambda(\omega_3)$.

For example, in FIG. 10, a fiber grating 42 is connected between first end 12A of EDF 12 and the output port of optical isolator 14, and a fiber grating 44 is connected between second end 12B of EDF 12 and WDM coupler 26. The Bragg reflection wavelength of each of fiber gratings 42 and 44 is $\lambda(\omega_3)$. Accordingly, an optical resonator structure including EDF 12 and two reflectors (fiber gratings 42 and 44) provided on the opposite sides of EDF 12 is obtained, so that a second pump light beam is generated by laser oscillation in EDF 12 to obtain an effect similar to that in FIG. 8.

Fiber gratings 42 and 44 in FIG. 10 may be replaced, for example, by optical filters each including a dielectric multilayer film as the two reflectors provided on the opposite sides of EDF 12. In this case, each reflector has wavelength selectivity, and a second pump light beam can be generated by oscillation between the two reflectors. Accordingly, by making the wavelength selectivity of each reflector variable, the detuning wavelength between the optical signal and the converted optical signal can be adjusted. For example, the wavelength selectivity of each reflector can be varied by changing an angle of incidence on the optical filter. Alternatively, the wavelength selectivity of each reflector can be varied by distributing the thickness of the dielectric multilayer film of the optical filter and displacing the dielectric multilayer film in a direction not parallel to an optical path, e.g., in a direction substantially perpendicular to the optical path.

Figure 11:
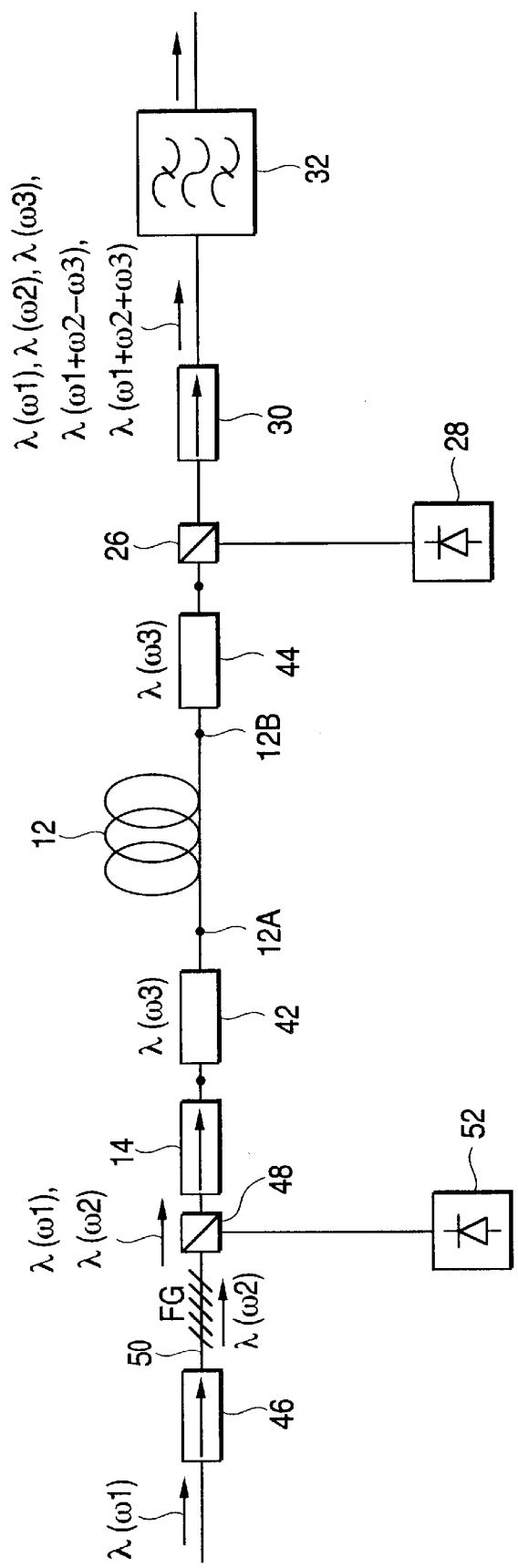
FIG. 11 is a diagram illustrating an apparatus for wavelength conversion, according to an embodiment of the present invention.

FIG. 11 is a diagram illustrating an apparatus for wavelength conversion, according to an embodiment of the present invention. Referring now to FIG. 11, an optical isolator 46 and a WDM coupler 48 are connected by an EDF 50, and a laser diode 52 for pumping EDF 50 is connected to WDM coupler 48. Pumping light output from laser diode 52 is supplied through WDM coupler 48 to EDF 50. EDF 50 is formed with a fiber grating FG, and a first pump light beam having a wavelength $\lambda(\omega_2)$ is generated in EDF 50 by laser oscillation due to distributed feedback in fiber grating FG.

An optical signal having a wavelength $\lambda(\omega_1)$ is supplied through optical isolator 46 to EDF 50. The length of EDF 50 is set short enough to avoid FWM in EDF 50.

The optical signal and the first pump light beam are supplied from EDF 50 through WDM coupler 48 and optical isolator 14 in this order to fiber grating 42.

Like the embodiment shown in FIG. 10, a second pump light beam having a wavelength $\lambda(\omega_3)$ is generated by distributed Bragg reflection using fiber gratings 42 and 44 and EDF 12. Also, an effect similar to that in FIG. 10 can be obtained.

Figure 12:
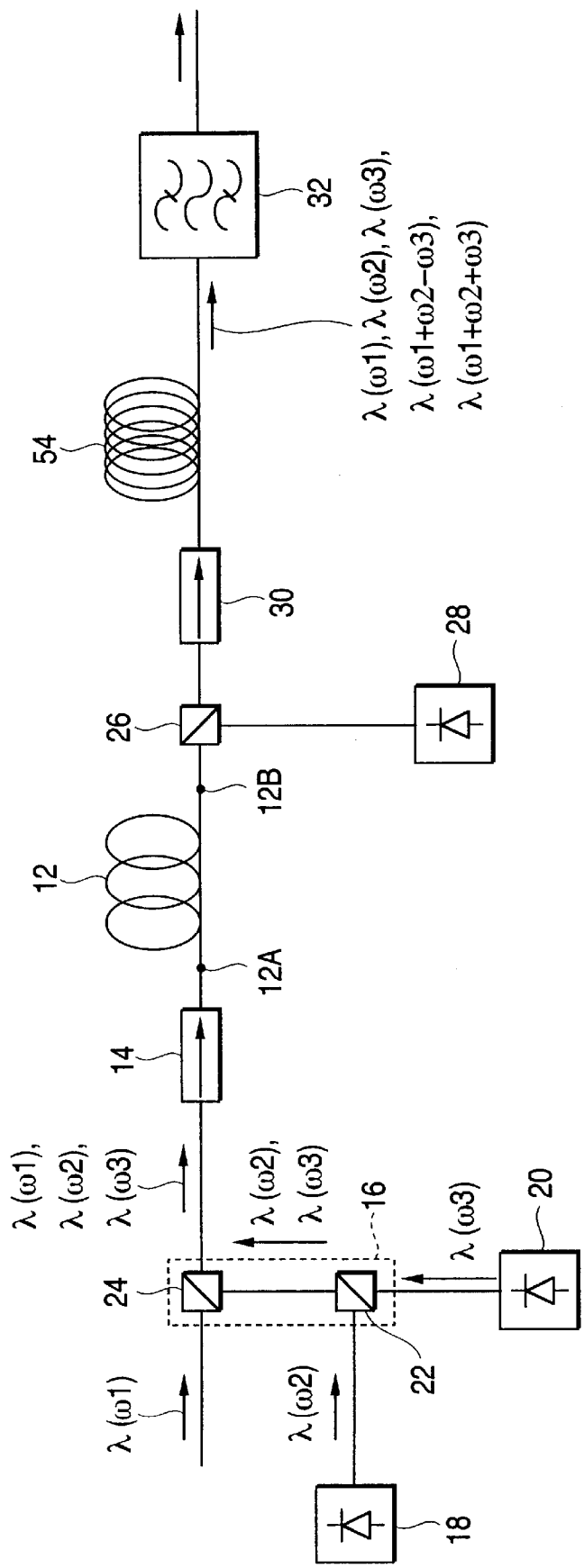
FIG. 12 is a diagram illustrating an apparatus for wavelength conversion, according to another embodiment of the present invention.

FIG. 12 is a diagram illustrating an apparatus for wavelength conversion, according to another embodiment of the present invention. In contrast to the configuration in FIG. 7, the configuration in FIG. 12 includes an optical fiber 54 undoped with a rare earth compound provided as a nonlinear optical medium optically connected to EDF 12. More specifically, optical fiber 54 is connected between optical isolator 30 and optical bandpass filter 32.

A suitable example of optical fiber 54 is a fiber having low losses to the converted optical signal and having a large length of nonlinear interaction. Preferably, optical fiber 54 provides chromatic dispersion in the range of ±5 ps/nm/km to the converted optical signal, so as to satisfy a phase matching condition. Further, preferably, optical fiber 54 is a polarization maintaining fiber for a reason similar to that mentioned above for EDF 12.

In FIG. 12, the optical signal and the first and second pump light beams all amplified in EDF 12 are supplied through WDM coupler 26 and optical isolator 30 in this order to optical fiber 54. Accordingly, FWM is produced not only in EDF 12, but also in optical fiber 54, so that the efficiency of conversion from the optical signal to the converted optical signal can be improved.

While optical fiber 54 as a nonlinear optical medium is optically connected through WDM coupler 26 and optical isolator 30 to EDF 12, the nonlinear optical medium may be connected directly to second end 12B of EDF 12 in order to reduce the loss between EDF 12 and the nonlinear optical medium and thereby further improve the conversion efficiency.

To increase an optical power density in a fiber and thereby improve the conversion efficiency, each of EDF 12 and optical fiber 54 preferably has a mode field diameter of 6 μm or less.

In the above embodiments of the present invention, the length of EDF 12 is preferably set to 100 m or more, so as to effectively produce FWM in EDF 12.

In FIGS. 10, 11 and 12, filter 32 is preferably a variable filter if the overall apparatus is being used as a variable wavelength converter. An acousto-optical tunable filter (AOTF) can be used as a variable filter 32.

Figure 13:
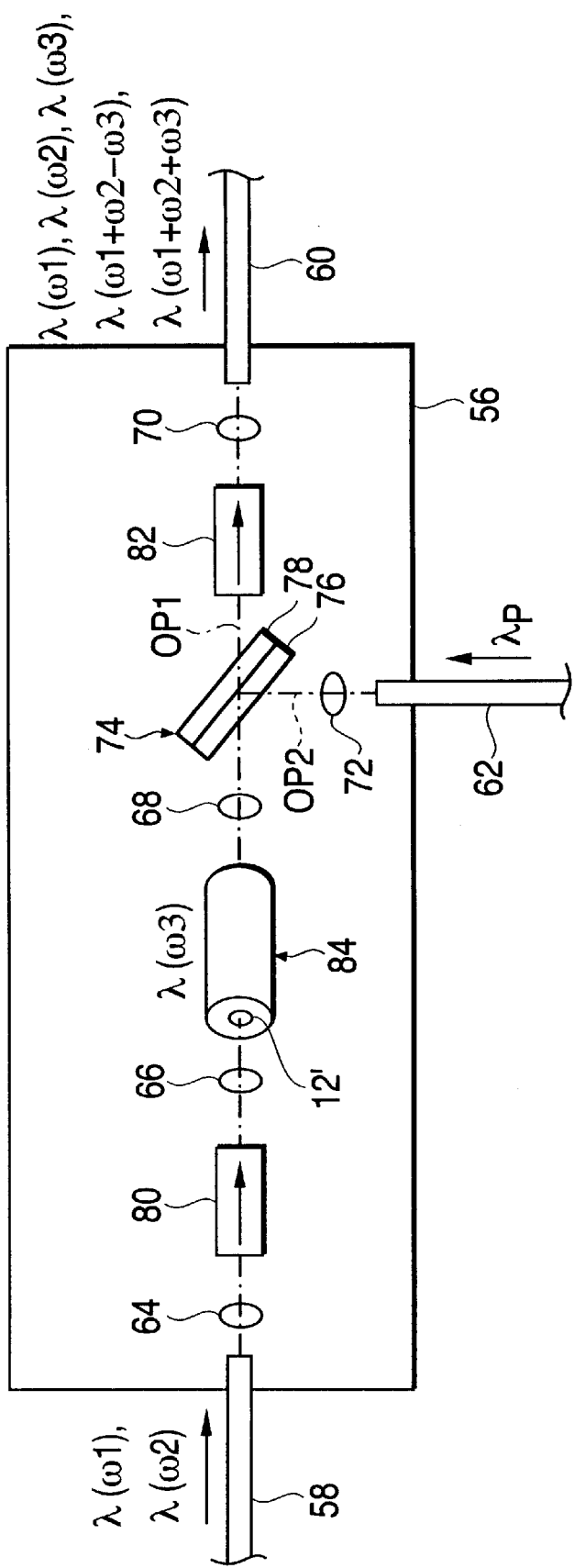
FIG. 13 is a diagram illustrating an apparatus for wavelength conversion, according to an embodiment of the present invention.

FIG. 13 is a diagram illustrating an apparatus for wavelength conversion, according to an embodiment of the present invention. This apparatus includes a unit for obtaining functions of optical isolator 14, EDF 12, WDM coupler 26, and optical isolator 30 provided by fiber connection, for example, in FIG. 8. This unit is provided in the form of bulk in a housing 56.

More specifically, optical fibers 58, 60, and 62 are fixed to housing 56. An optical path OP1 is formed by lenses 64, 66, 68, and 70 between optical fibers 58 and 60. Another optical path OP2 is formed by a lens 72 between optical fiber 62 and the optical path OP1. The optical paths OP1 and OP2 are coupled by a WDM coupler 74 corresponding to WDM coupler 26 in FIG. 8.

WDM coupler 74 is obtained by forming a dielectric multilayer film 78 on a transparent substrate 76, for example. An optical isolator 80 corresponding to optical isolator 14 in FIG. 8 is provided between lenses 64 and 66, and an optical isolator 82 corresponding to optical isolator 30 in FIG. 8 is provided between WDM coupler 74 and lens 70. A wavelength conversion element 84 corresponding to EDF 12 in FIG. 8 is provided between lenses 62 and 68.

Wavelength conversion element 84 can be provided as a separate component, and it can be manufactured in the following manner, for example.

Figure 14:
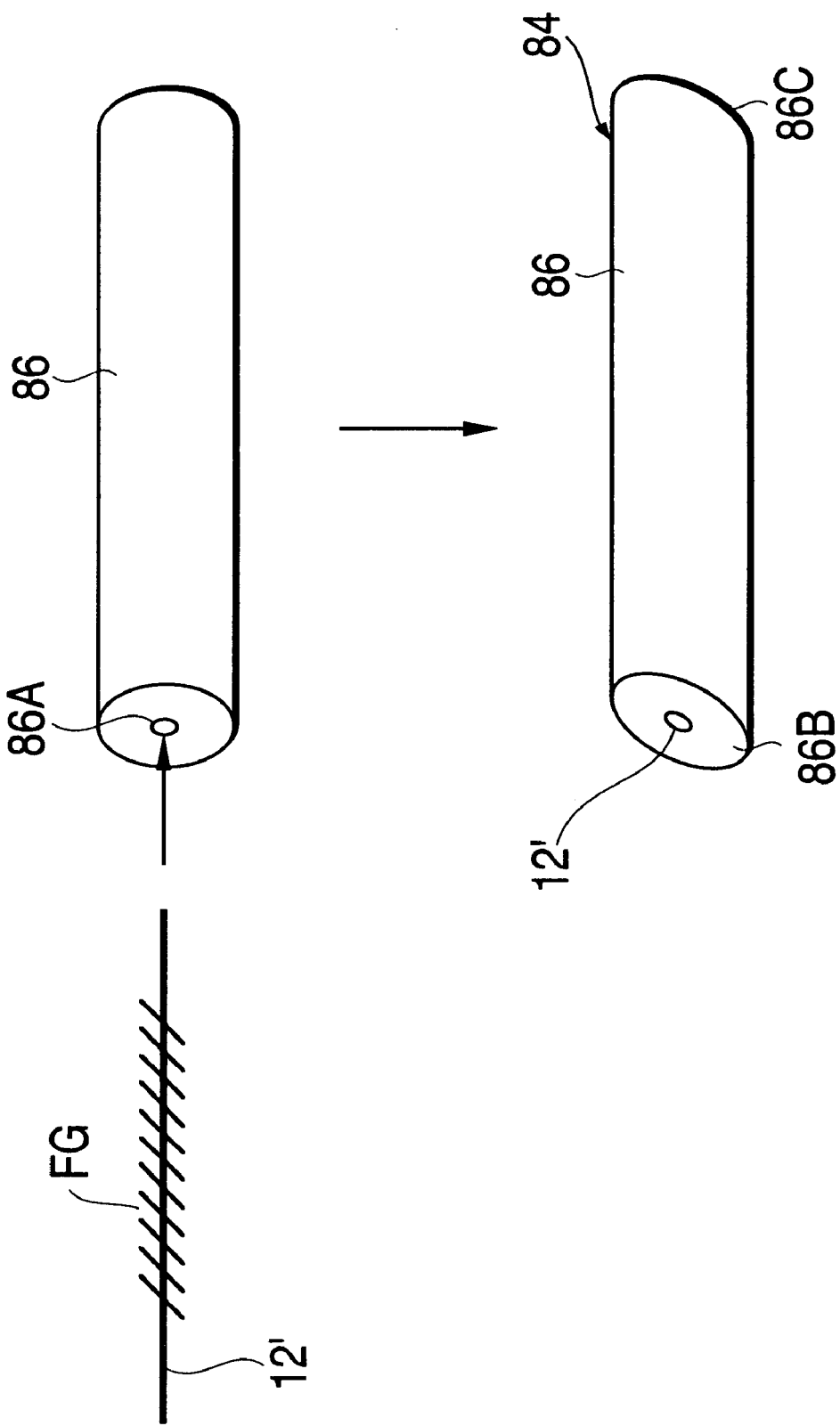
FIG. 14 is a diagram illustrating a manufacturing method for a wavelength conversion element used in FIG. 13, according to an embodiment of the present invention.

FIG. 14 is a diagram illustrating a manufacturing method for wavelength conversion element 84 in FIG. 13, according to an embodiment of the present invention. First, an EDF 12' formed with a fiber grating FG is provided. EDF 12' is provided by a fluoride fiber, for example. The fluoride fiber has an advantage such that even when it is doped with a high concentration of Er (erbium) compound as a dopant, scattering due to the dopant hardly occurs, so that EDF 12' can be shortened in length. More specifically, the concentration of the dopant is preferably set to 50,000 ppm or higher, so as to reduce the length of EDF 12' to 10 cm or less and obtain a sufficient conversion efficiency.

In the next step, EDF 12' is inserted into a thin hole 86A of a ferrule 86 formed of zirconia, glass, stainless steel, etc., and fixed in thin hole 86A.

In the next step, opposite end faces 86B and 86C of ferrule 86 are polished so as to be inclined to a plane perpendicular to the axis of EDF 12'.

Finally, an antireflection coating such as a dielectric multilayer film is formed on each of end faces 86B and 86C, thus completing wavelength conversion element 84.

The operation of the apparatus will now be described with reference to FIG. 13. An optical signal having a wavelength $\lambda(\omega_1)$ and a first pump light beam having a wavelength $\lambda(\omega_2)$ are supplied from optical fiber 58 through optical isolator 80 to EDF 12' of wavelength conversion element 84. On the other hand, pumping light having a wavelength p from a pumping source (not shown) is supplied through WDM coupler 74 to EDF 12' in a direction opposite to the propagation direction of the optical signal and the first pump light beam.

In EDF 12', a second pump light beam having a wavelength $\lambda(\omega_3)$ is generated in the same manner as that mentioned in previous embodiments, so that a converted optical signal is generated by FWM in EDF 12'.

All of the optical signal, the first and second pump light beams, and the converted optical signal from wavelength conversion element 84 are supplied through WDM coupler 74 and optical isolator 82 to optical fiber 60.

According to the present embodiment of the present invention, the efficiency of conversion from the optical signal to the converted optical signal can be improved in accordance with the principle similar to that of each previous embodiment. In particular, the present embodiment has an additional effect that wavelength conversion element 84 can be provided as a separate component, thereby allowing easy fabrication of the apparatus.

Furthermore, since end faces 86B and 86C of ferrule 86 are inclined to a plane perpendicular to the axis of EDF 12', reflection on end faces 86B and 86C can be prevented to thereby eliminate a possibility of undesired oscillation in wavelength conversion element 84.

Additionally, since fluoride fiber has a deliquescent property in general, the combination of ferrule 86 and the antireflection coating formed on the opposite ends thereof is greatly effective in providing a hermetic seal structure and improving the stability of the fluoride fiber.

WD In the above embodiments of the present invention, the laser oscillation wavelength of each fiber grating can be changed by changing the grating pitch thereof, so that the wavelength of the first pump light beam and/or the wavelength of the second pump light beam can be changed. Accordingly, the detuning wavelength between the optical signal and the connected optical signal can be set to an arbitrary value. The grating pitch of the fiber grating can be changed, for example, by changing the temperature of the optical waveguide structure including the fiber grating by use of a Peltier element.

According to the above embodiments of the present invention, the principles of FWM are used to create a converted optical signal having a different wavelength than an input optical signal. Therefore, the embodiments of the present invention allow for wavelength conversion and wavelength management. Therefore, as should be understood from the above embodiments of the present invention, a specific pump light beam can be selected, or the wavelength of a pump light beam can be controlled, so that FWM causes the converted optical signal to have a specific, target wavelength determined by principles of FWM.

For example, in FIG. 7, either or both of laser diodes LD 18 and 20 can be selected to provide a pump light beam at a suitable wavelength for producing a converted optical signal at a target wavelength. The same principle applies to all of the above embodiments of the present invention, so that a pump light beam source is selected so that the converted optical signal is at a target wavelength.

Further, in the above embodiments of the present invention using fiber gratings, a fiber grating can be selected or controlled to provide a light at a suitable wavelength so that the converted optical signal is at a target wavelength.

Figure 15:
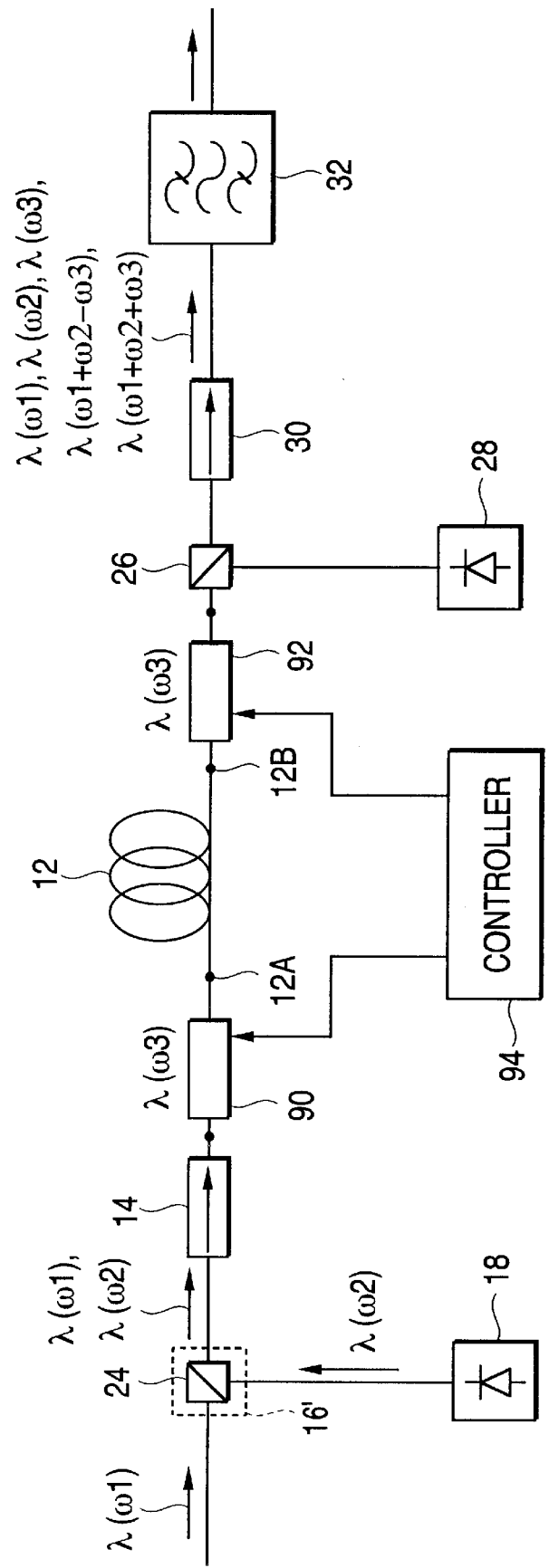
FIG. 15 is a diagram illustrating an apparatus for wavelength conversion, and having a controller for controlling the wavelength of a pump light beam provided by a wavelength selective device, according to an embodiment.

For example, FIG. 15 is a diagram illustrating an apparatus for wavelength conversion, and having a controller for controlling the wavelength of a pump light beam provided by a wavelength selective device, according to an embodiment. More specifically, FIG. 15 is similar to FIG. 10, but illustrates the use of wavelength selective devices 90 and 92. Wavelength selective devices 90 and 92 can be, for example, optical filters each including a dielectric multilayer film as the two reflectors provided on the opposite sides of EDF 12. In this case, each reflector has wavelength selectivity, and a second pump light beam can be generated by oscillation between the two reflectors. Accordingly, by making the wavelength selectivity of each reflector variable, the detuning wavelength between the optical signal and the converted optical signal can be adjusted. As an additional example, wavelength selective devices 90 and 92 can be fiber gratings having a variable grating pitch.

In FIG. 15, a controller 94 controls wavelength selective devices 90 and 92 so that the converted optical signal is at a target wavelength. Of course, any of the above embodiments of the present invention can be modified to include wavelength selective devices and a controller, to produce the converted optical signal at a target wavelength, and such a configuration is not intended to be limited to the specific configuration in FIG. 15. Further, there are many different types of devices which can operate as a wavelength selective device, and the present invention is not intended to be limited to the specific example illustrated in FIG. 15.

Moreover, a variable wavelength light source can be used to provide a pump light beam, and a controller can be used to control the light source to provide a suitable pump light beam so that the converted optical signal is at a target wavelength. In this case, for example, a DFB-LD can be used as a variable wavelength light source as, for example, laser diode 18 in FIG. 10, or as a pump light beam source in various of the other embodiments of the present invention described herein.

Figure 16:
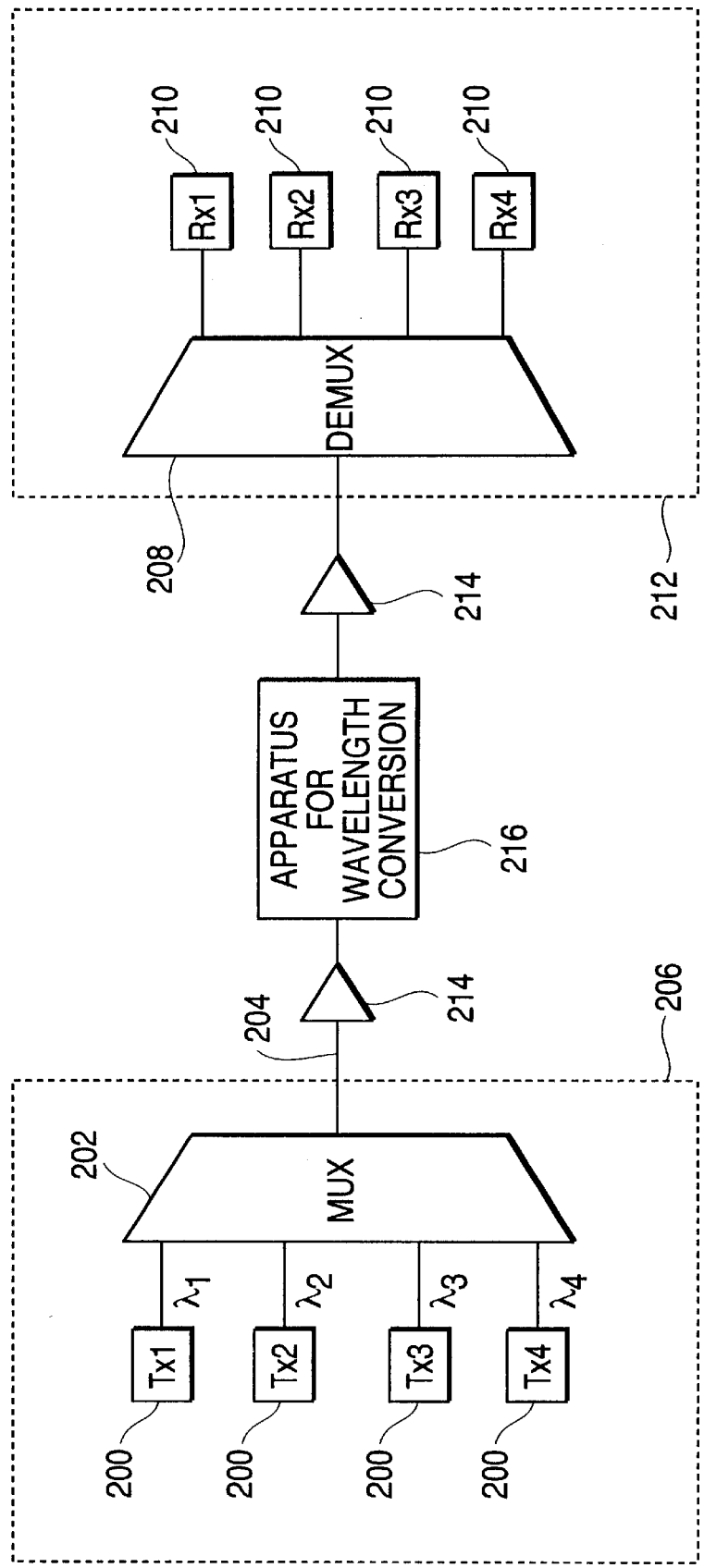
FIG. 16 is a diagram illustrating a WDM optical communication system employing an apparatus for wavelength conversion according to the above embodiments of the present invention.

FIG. 16 is a diagram illustrating a WDM optical communication system employing an apparatus for wavelength conversion according to the above embodiments of the present invention. Referring now to FIG. 16, a plurality of individual transmitters (TX) 200 transmit optical signals at different wavelengths. The optical signals are then multiplexed together by a multiplexer (MUX) 202 into a WDM signal which is transmitted through an optical fiber transmission line 204. Thus, individual transmitters 200 and multiplexer 202 together form a transmitter 206 transmitting a WDM signal through transmission line 204. A demultiplexer (DEMUX) 208 demultiplexes the WDM signal into individual optical signals received by respective receivers (RX) 210. Thus, demultiplexer 208 and receivers 210 together from a receiver 212 receiving the transmitted WDM signal through transmission line 204. Typically, optical amplifiers, such as optical amplifier 214, would be positioned along transmission line 204.

An apparatus for wavelength conversion 216 performs wavelength conversion in accordance with any of the embodiments of the present invention described herein. For example, apparatus for wavelength conversion 216 can have a configuration as illustrated, for example, in FIGS. 4 through 15.

FIG. 16 illustrates examples of transmitters and receivers. However, the present invention is not intended to be limited to these examples. Instead, there are many different configurations of transmitters and receivers.

According to the above embodiments of the present invention, a light source provides a pump light beam to cause FWM. Such a light source can be, for example, a laser diode, a fiber grating, or any other source for producing a pump light beam, as described in the above embodiments of the present invention.

While specific embodiments of the present invention have been described in the case that an EDF is used as the optical waveguide structure doped with the rare earth compound, the present invention is not limited to this. For example, the present invention may be carried out by using a fiber doped with any one of other rare earth compounds containing Nd, Yb, etc. Further, while the optical waveguide structure is provided by an optical fiber in the above embodiments, it may be formed, for example, by doping an optical waveguide formed on a waveguide substrate with a rare earth compound. Moreover, the present invention is not intended to be limited to the use of a rare earth "compound". Instead, in any of the embodiments described herein, an optical waveguide structure can simply be doped with a rare earth "element".

Moreover, two or more of the above embodiments may be combined to carry out the present invention.

According to the above embodiments of the present invention, there is provided a method for wavelength conversion which includes (a) providing an optical waveguide structure doped with a rare earth element; (b) pumping the optical waveguide structure so that the optical waveguide structure provides a gain band; (c) inputting an optical signal and at least one pump light beam into the optical waveguide structure; and (d) outputting from the optical waveguide structure a converted optical signal having a wavelength different from the wavelength of the optical signal, the converted optical signal being generated by four-wave mixing based on the optical signal and the at least one pump light beam in the optical waveguide structure.

In the case that the optical signal and the at least one pump light beam have wavelengths included in the gain band provided by the optical waveguide structure, for example, the powers of the optical signal and the at least one pump light are increased to result in efficient yielding of nonlinear effects. Accordingly, the conversion efficiency in wavelength conversion from the optical signal to the converted optical signal can be improved.

Preferably, the optical waveguide structure is an optical fiber in which a fiber grating is formed. In this case, the at least one pump light beam can include light generated by oscillation in the fiber grating, thereby achieving the wavelength conversion with a simple configuration.

In particular, as indicated by FIG. 15, by using a controller, for example, to change the grating pitch of a fiber grating, the wavelength of the pump light beam obtained by oscillation in the fiber grating can be changed. Accordingly, the wavelength of the converted optical signal determined by the relation between the wavelength of the optical signal and the wavelength of the pump light beam can be adjusted. The grating pitch of the fiber grating can be changed, for example, by changing the temperature of the fiber grating. Such changing of the wavelength of the pump light beam can yield an advantage that the detuning wavelength between the optical signal and the converted optical signal is adjustable.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   an optical waveguide doped with a rare earth element and pumped so that an input optical signal is amplified as the input optical signal travels through the optical waveguide, wherein the optical waveguide is provided with at least one light which, together with the input optical signal, causes four wave mixing (FWM) to occur in the optical waveguide, the FWM causing a converted optical signal to be produced in the optical waveguide and having a wavelength different from the input optical signal.

2. An apparatus as in claim 1, wherein the input optical signal is modulated by a transmission signal, so that the converted optical signal is also modulated by the transmission signal.

3. An apparatus as in claim 1, wherein the optical waveguide is an optical fiber.

4. An apparatus as in claim 1, wherein the optical waveguide is an erbium doped fiber.

5. An apparatus as in claim 1, wherein the optical waveguide is an erbium doped fiber provided with pump light having a wavelength included in a 0.98 µm band or a 1.48 µm band so that the erbium doped fiber has a gain band which includes 1.55 µm.

6. An apparatus as in claim 1, wherein the input optical signal and said at least one light have wavelengths within a gain band of the optical waveguide.

7. An apparatus as in claim 1, further comprising:
a grating, wherein said at least one light includes light generated by oscillation in the grating.

8. An apparatus as in claim 1, wherein said at least one light includes first and second lights at different wavelengths, the apparatus further comprising:
a first grating, the first light being generated by oscillation in the first grating; and
a second grating, the second light being generated by oscillation in the second grating.

9. An apparatus as in claim 1, further comprising:
a light generating device generating said at least one light, the light generating device being controllable to change the wavelength of said at least one light.

10. An apparatus as in claim 1, wherein the converted optical signal is output from the optical waveguide, the apparatus further comprising:
a filter having a passband which passes the converted optical signal output from the optical waveguide.

11. An apparatus as in claim 1, further comprising:
a filter filtering output from the optical waveguide, the filter having a passband which passes the converted optical signal and rejects light having a wavelength different from that of the converted optical signal.

12. An apparatus as in claim 1, wherein a wavelength of a light of said at least one light is changeable to cause the wavelength of the converted optical signal to be at a target wavelength.

13. An apparatus comprising:
a fiber doped with a rare earth element, an optical signal and at least one other light travelling through the fiber;
a pump source pumping the fiber so that the fiber provides a gain band which includes the optical signal, wherein said at least one other light, together with the optical signal, causes four wave mixing (FWM) to occur in the fiber, the FWM causing a converted optical signal to be produced in the fiber and having a wavelength different from the optical signal.

14. An apparatus as in claim 13, wherein:
the fiber has a first end and a second end, the optical signal travels through the fiber from the first end to the second end,
the converted optical signal is output from the second end of the fiber, and
the pump source pumps the fiber with pump light travelling from at least one of the group consisting of
the first end of the fiber to the second end, and
the second end of the fiber to the first end.

15. An apparatus as in claim 14, wherein said at least one other light includes first and second lights, the apparatus further comprising:
an optical multiplexer multiplexing the optical signal, the first light and the second light together into a multiplexed light, and then providing the multiplexed light to the first end of the fiber to travel through the fiber from the first end to the second end.

16. An apparatus as in claim 14, wherein said at least one other light includes first and second lights, the apparatus further comprising:
an optical multiplexer multiplexing the optical signal and the first light together into a multiplexed light, and then providing the multiplexed light to the fiber to travel through the fiber; and
a fiber grating formed in the fiber, the second light generated by oscillation in the fiber grating.

17. An apparatus as in claim 13, wherein said at least one other light includes first and second lights, the apparatus further comprising:
a first grating formed in the fiber, the first light being generated by oscillation in the first grating; and
a second grating formed in the fiber, the second light being generated by oscillation in the second grating.

18. An apparatus as in claim 14, wherein said at least one other light includes first and second lights, the apparatus further comprising:
an optical multiplexer multiplexing the optical signal and the first light together into a multiplexed light, and then providing the multiplexed light to the first or second end of the fiber to travel through the fiber; and
first and second fiber gratings optically connected to the first and second ends of the fiber, respectively, the second light generated by oscillation between the first and second fiber gratings.

19. An apparatus as in claim 13, further comprising:
an optical fiber optically connected to the doped fiber for extracting the converted optical signal.

20. An apparatus as in claim 13, further comprising:
an optical isolator optically connected to the doped fiber.

21. An apparatus as in claim 13, wherein the doped fiber is an erbium doped fiber provided with pump light having a wavelength included in a 0.98 µm band or a 1.48 µm band so that the erbium doped fiber has a gain band which includes 1.55 µm.

22. An apparatus as in claim 13, further comprising:
a ferrule holding the doped fiber.

23. An apparatus as in claim 22, wherein the ferrule has opposite end faces inclined with respect to a plane perpendicular to an axis of the doped fiber.

24. An apparatus as in claim 22, further comprising an antireflection coating formed on each of opposite end faces of the ferrule.

25. An apparatus as in claim 13, wherein the fiber is a fluoride fiber.

26. An apparatus as in claim 13, wherein a concentration of the rare earth element doped in the fiber is 50,000 ppm or higher.

27. An apparatus as in claim 13, wherein the fiber is a polarization maintaining fiber causing a polarization plane of the optical signal to be substantially parallel to a polarization plane of a light of said at least one other light.

28. An apparatus as in claim 13, wherein the fiber is a polarization maintaining fiber.

29. An apparatus as in claim 13, further comprising a nonlinear optical medium optically connected to the doped fiber for extracting the converted optical signal.

30. An apparatus as in claim 29, wherein the nonlinear optical medium is an optical fiber.

31. An apparatus as in claim 29, wherein the nonlinear optical medium provides chromatic dispersion in the range of ±5 ps/nm/km to the converted optical signal.

32. An apparatus as in claim 29, wherein the nonlinear optical medium is a polarization maintaining fiber, and the doped fiber is a polarization maintaining fiber.

33. An apparatus as in claim 13, further comprising:
a fiber grating, said at least one other light including a light generated by oscillation in a fiber grating; and
a grating controller which changes a pitch of the fiber grating.

34. An apparatus as in claim 13, wherein the fiber has first and second ends, the apparatus further comprising:
first and second reflectors optically connected to the first and second ends of the fiber, respectively,
said at least one other light including a light generated by oscillation between the first and second reflectors.

35. An apparatus as in claim 34, wherein each of the first and second reflectors has variable wavelength selectivity.

36. An apparatus as in claim 14, further comprising:
a filter optically connected to the second end of the fiber and having a passband which passes the converted optical signal.

37. An apparatus as in claim 14, further comprising:
a filter optically connected to the second end of the fiber and having a passband which passes the converted optical signal and rejects light having a wavelength different from that of the converted optical signal.

38. An apparatus as in claim 13, wherein a frequency of a light of said at least one light is changeable to cause the wavelength of the converted optical signal to be at a target wavelength.

39. An apparatus comprising:
a rare earth doped optical fiber having first and second lights travelling therethrough;
a pump source providing pump light to the fiber so that the first light is amplified as the first light travels through the fiber, wherein the first and second lights together cause four wave mixing (FWM) to occur in the fiber, the FWM causing a third light to be produced in the fiber and having a wavelength different from the first light.

40. An apparatus as in claim 39, wherein:
the fiber has a first end and a second end,
the first light travels through the fiber from the first end to the second end,
the third light is output from the second end of the fiber, and
the pump light travels from at least one of the group consisting of
the first end of the fiber to the second end, and
the second end of the fiber to the first end.

41. An apparatus as in claim 40, further comprising:
an optical multiplexer multiplexing the first and second lights together into a multiplexed light, and then providing the multiplexed light to the first end of the fiber to travel through the fiber from the first end to the second end.

42. An apparatus as in claim 39, further comprising:
a fiber grating formed in the fiber, the second light generated by oscillation in the fiber grating.

43. An apparatus as in claim 39, wherein
the doped fiber is an erbium doped fiber provided with pump light having a wavelength included in a 0.98 μm band or a 1.48 μm band so that the erbium doped fiber has a gain band which includes 1.55 μm.

44. An apparatus as in claim 39, wherein the fiber is a polarization maintaining fiber.

45. An apparatus as in claim 39, further comprising:
a fiber grating, the second light generated by oscillation in a fiber grating; and
a grating controller which changes a pitch of the fiber grating.

46. An apparatus as in claim 39, wherein the fiber has first and second ends, the apparatus further comprising:
first and second reflectors optically connected to the first and second ends of the fiber, respectively, the second light generated by oscillation between the first and second reflectors.

47. An apparatus as in claim 46, wherein each of the first and second reflectors has variable wavelength selectivity.

48. An apparatus as in claim 40, further comprising:
a filter optically connected to the second end of the fiber and having a passband which passes the third light.

49. An apparatus as in claim 40, further comprising:
a filter optically connected to the second end of the fiber and having a passband which passes the third light and rejects light having a wavelength different from that of the third light.

50. An apparatus as in claim 39, wherein a wavelength of the second light is changeable to cause the wavelength of the third light to be at a target wavelength.

51. An apparatus as in claim 39, further comprising:
a controller controlling a wavelength of the second light to cause the third light to be at a target wavelength.

52. An apparatus comprising:
a rare earth doped optical fiber having first, second and third lights travelling therethrough;
a pump source providing pump light to the fiber so that the first light is amplified as the first light travels through the fiber, wherein the first, second and third lights together cause four wave mixing (FWM) to occur in the fiber, the FWM causing a fourth light to be produced in the fiber and having a wavelength different from the first light.

53. An apparatus as in claim 52, wherein:
the fiber has a first end and a second end,
the first light travels through the fiber from the first end to the second end,
the fourth light is output from the second end of the fiber, and
the pump light travels from at least one of the group consisting of
the first end of the fiber to the second end, and
the second end of the fiber to the first end.

54. An apparatus as in claim 52, further comprising:
an optical multiplexer multiplexing the second and third lights together into a multiplexed light, and then providing the multiplexed light to the fiber to travel through the fiber.

55. An apparatus as in claim 52, further comprising:
a first grating formed in the fiber, the second light being generated by oscillation in the first grating; and
a second grating formed in the fiber, the third light being generated by oscillation in the second grating.

56. An apparatus as in claim 53, further comprising: an optical multiplexer multiplexing the first and second lights together into a multiplexed light, and then providing the multiplexed light to the first or second end of the fiber to travel through the fiber; and first and second fiber gratings optically connected to the first and second ends of the fiber, respectively, the third light generated by oscillation between the first and second fiber gratings.

57. An apparatus as in claim 52, wherein the doped fiber is an erbium doped fiber provided with pump light having a wavelength included in a 0.98 µm band or a 1.48 µm band so that the erbium doped fiber has a gain band which includes 1.55 µm.

58. An apparatus as in claim 52, wherein the fiber is a polarization maintaining fiber.

59. An apparatus as in claim 52, wherein the fiber has first and second ends, the apparatus further comprising:

first and second reflectors optically connected to the first and second ends of the fiber, respectively, at least one of the second and third lights generated by oscillation between the first and second reflectors.

60. An apparatus as in claim 59, wherein each of the first and second reflectors has variable wavelength selectivity.

61. An apparatus as in claim 53, further comprising:

a filter optically connected to the second end of the fiber and having a passband which passes the converted optical signal.

62. An apparatus as in claim 53, further comprising:

a filter optically connected to the second end of the fiber and having a passband which passes the converted optical signal and rejects light having a wavelength different from that of the converted optical signal.

63. An apparatus as in claim 52, wherein a wavelength of at least one of the second and third lights is changeable to cause the wavelength of the fourth light to be at a target wavelength.

64. An apparatus as in claim 52, further comprising:

a controller controlling a wavelength of at least one of the second and third lights to cause the fourth light to be at a target wavelength.

65. An apparatus comprising:

a rare earth doped optical fiber having first and second lights travelling therethrough;

a pump source pumping the fiber so that the first light is amplified as the first light travels through the fiber, wherein the first and second lights together cause four wave mixing (FWM) to occur in the fiber, the FWM causing a third light to be produced in, and output from, the fiber, the third light having a wavelength different from the first and second lights; and a filter optically connected to the fiber to filter light output from the fiber, the filter having a passband which passes the third light and rejects light having a wavelength different from that of the third light.

66. An apparatus as in claim 65, further comprising:

a fiber grating formed in the fiber, the second light generated by oscillation in the fiber grating.

67. An apparatus as in claim 65, further comprising:

a light generating device generating the second light and having characteristics which are variable to set a wavelength of the second light.

68. An apparatus as in claim 65, wherein the fiber has first and second ends, the apparatus further comprising:

first and second reflectors optically connected to the first and second ends of the fiber, respectively, the second light generated by oscillation between the first and second reflectors.

69. An apparatus as in claim 68, wherein each of the first and second reflectors has variable wavelength selectivity.

70. An apparatus as in claim 65, further comprising:

a controller controlling a wavelength of the second light to cause the third light to be at a target wavelength.

71. An apparatus as in claim 65, wherein the first light is modulated by a transmission signal, so that the third light is also modulated by the transmission signal.

72. A method comprising:

pumping a rare earth doped optical fiber so that a first light travelling through the fiber is amplified;

providing a second light which travels through the fiber and, together with the first light, causes four wave mixing (FWM) to occur in the fiber, the FWM causing a third light to be produced in the fiber and having a wavelength different from the first light.

73. A method as in claim 72, wherein:

the fiber has a first end and a second end, the first light travels through the fiber from the first end to the second end, the third light is output from the second end of the fiber, and said pumping pumps the fiber with pump light that travels from at least one of the group consisting of the first end of the fiber to the second end, and the second end of the fiber to the first end.

74. A method as in claim 73, further comprising:

multiplexing the first and second lights together into a multiplexed light; and providing the multiplexed light to the first end of the fiber to travel through the fiber from the first end to the second end.

75. A method as in claim 72, further comprising:

generating the second light by oscillation in a fiber grating formed in the fiber.

76. A method as in claim 72, wherein the fiber is a polarization maintaining fiber.

77. A method as in claim 72, further comprising:

generating the second light by oscillation in a fiber grating formed in the fiber; and changing a pitch of the fiber grating to change a wavelength of the second light.

78. A method as in claim 72, wherein the fiber has first and second ends, the process further comprising:

generating the second light by oscillation between first and second reflectors optically connected to the first and second ends of the fiber, respectively.

79. A method as in claim 78, wherein each of the first and second reflectors has variable wavelength selectivity.

80. A method as in claim 73, further comprising:

filtering light output from the second end of the fiber with a passband which passes the third light.

81. A method as in claim 73, further comprising:

filtering light output from the second end of the fiber with a passband which passes the third light and rejects light having a wavelength different from that of the third light.

82. A method as in claim 72, further comprising:

A controlling a wavelength of the second light to cause the third light to be at a target wavelength.

83. A method as in claim 72, further comprising:

modulating the first light by a transmission signal, so that the third light is also modulated by the transmission signal.

84. A method as in claim 82, further comprising:

modulating the first light by a transmission signal, so that the third light is also modulated by the transmission signal.

85. An optical communication system comprising:

a transmitter transmitting an optical signal;

a rare earth doped optical fiber, the optical signal travelling through the fiber;

a pump source providing pump light to the fiber so that the optical signal is amplified as the optical signal travels through the fiber;

a light source providing a light to the fiber so that the light, together with the optical signal, causes four wave mixing (FWM) to occur in the fiber, the FWM causing a converted optical signal to be produced in the fiber and having a wavelength different from the optical signal transmitted by the transmitter; and a receiver receiving the converted optical signal from the fiber.

86. An optical communication method comprising:

transmitting an optical signal through a rare earth doped optical fiber;

pumping the fiber so that the optical signal is amplified as the optical signal travels through the fiber;

providing a light to the fiber which, together with the optical signal, causes four wave mixing (FWM) to occur in the fiber, the FWM causing a converted optical signal to be produced in the fiber and having a wavelength different from the transmitted optical signal; and receiving the converted optical signal from the fiber.

\* \* \* \* \*